INVENTOR.
*Theron H. Jensen*
BY

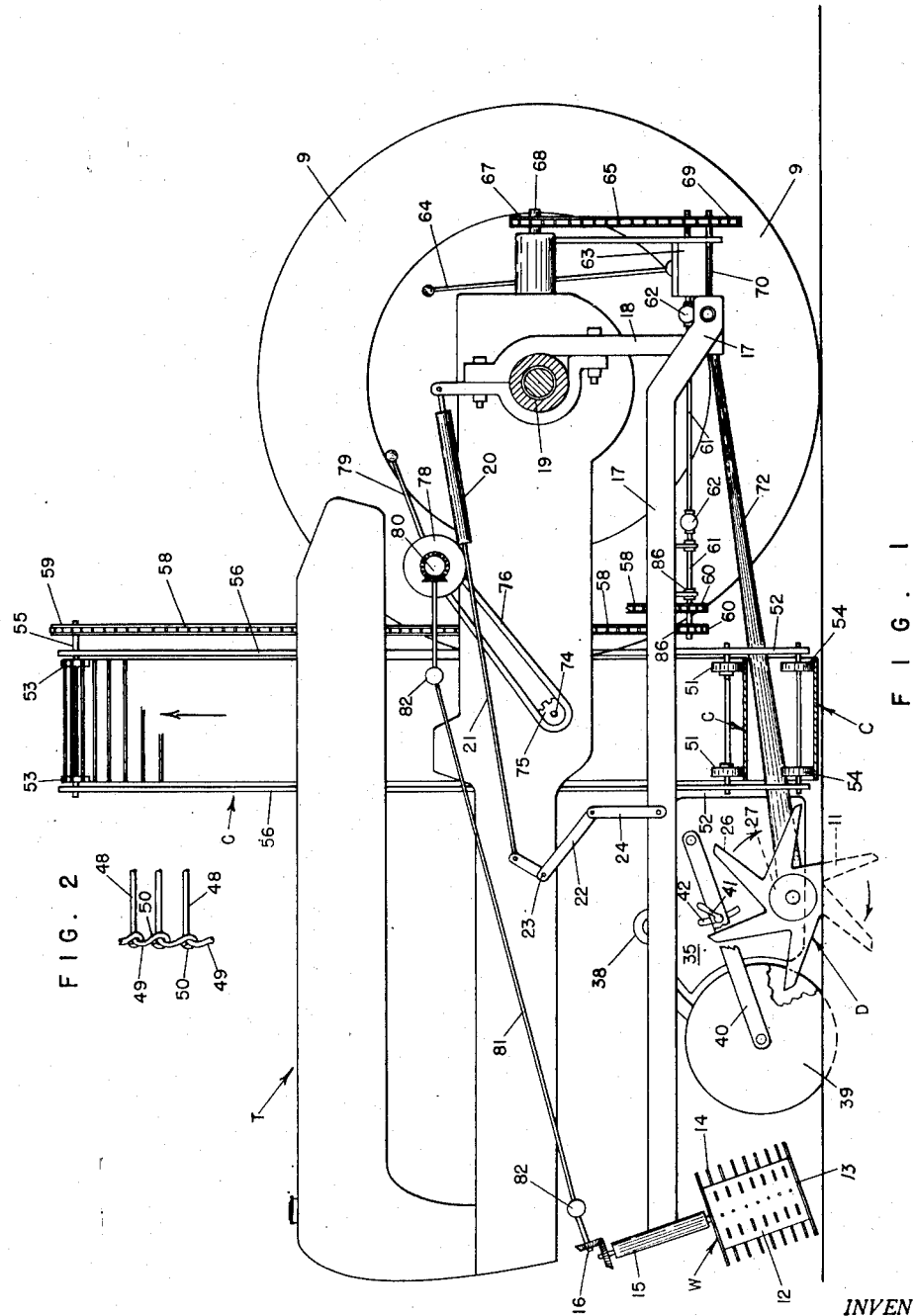

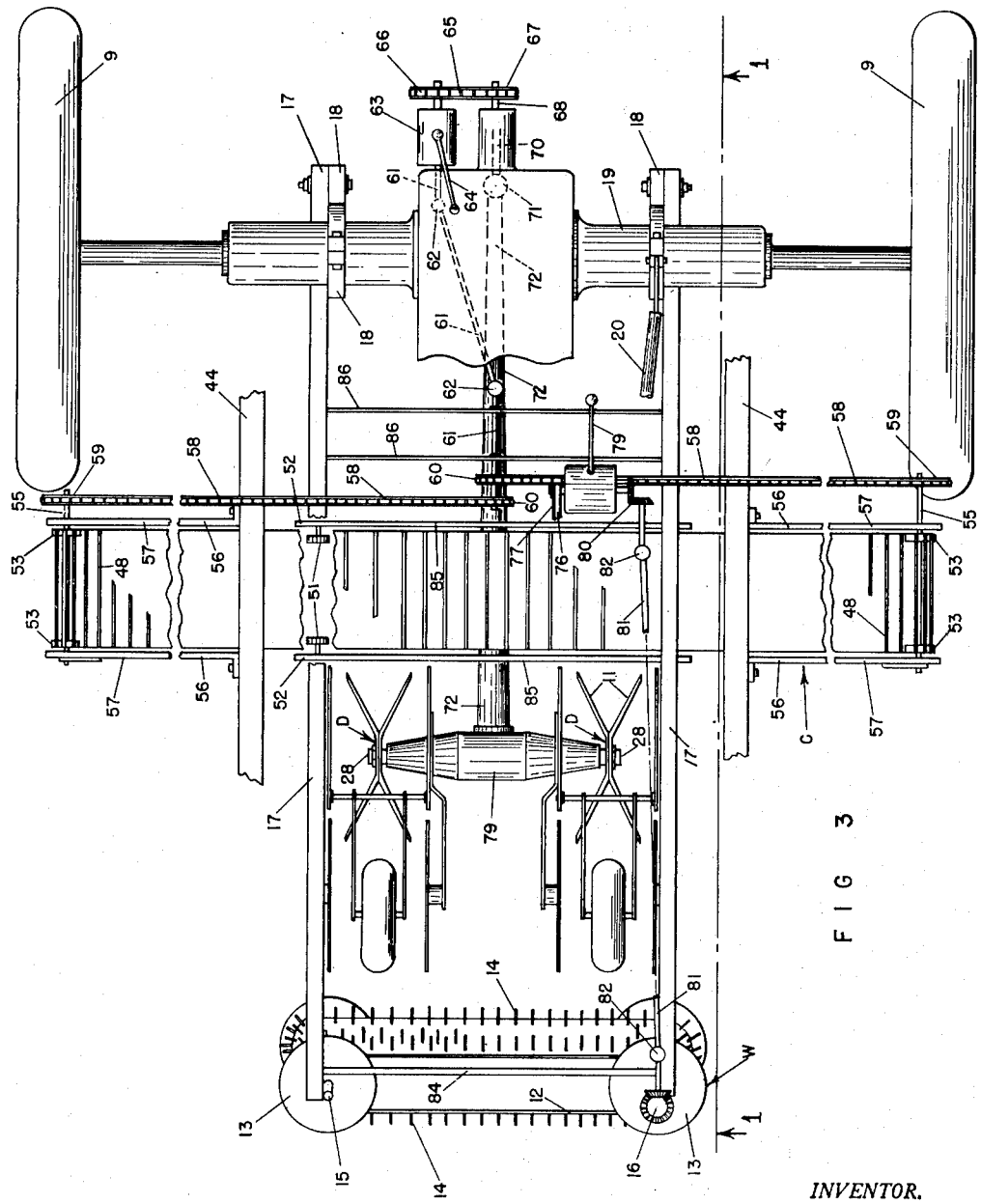

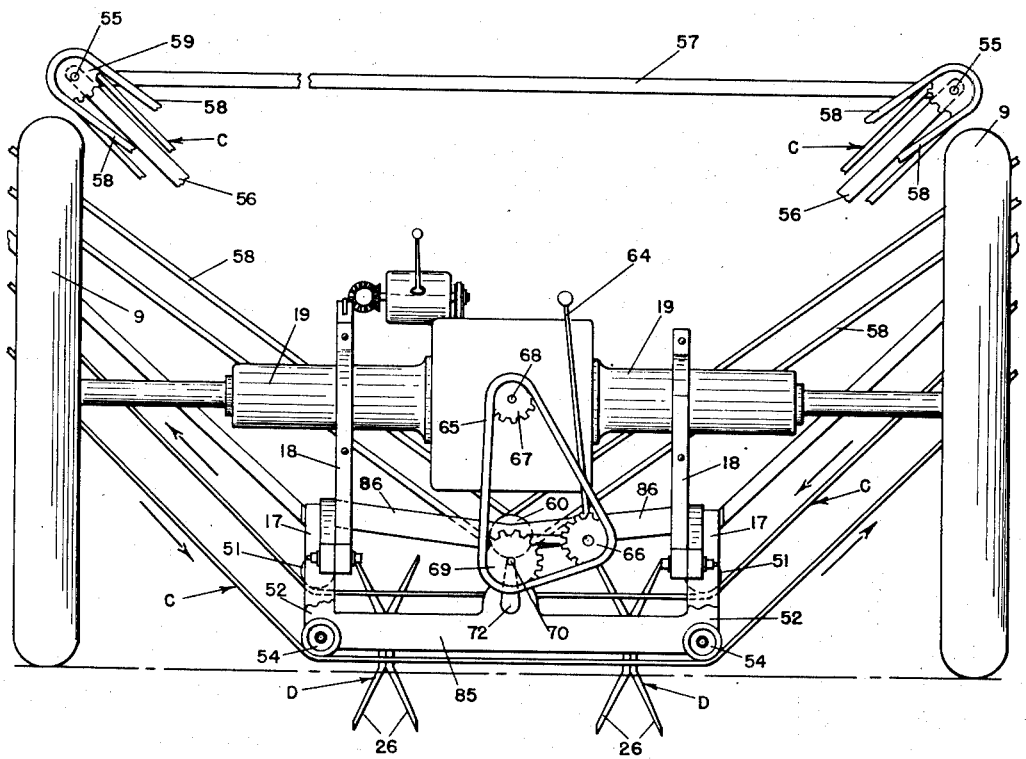
FIG. 4
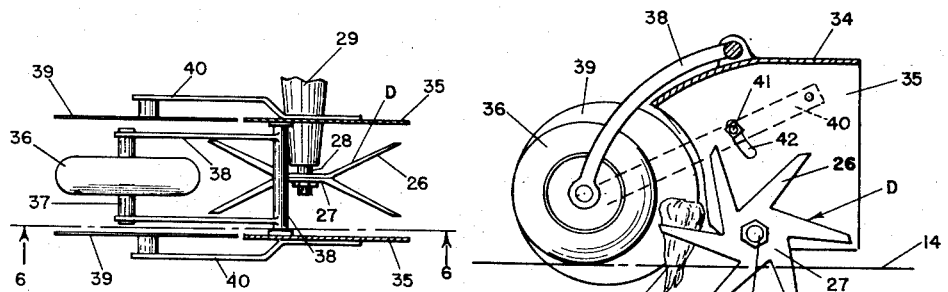
FIG. 5
FIG. 6
INVENTOR.
Theron H. Jensen
BY
ATTORNEY

ATTORNEY

Patented Jan. 1, 1952

2,580,432

UNITED STATES PATENT OFFICE 2,580,432

BEET HARVESTER WITH LIFTER

Theron H. Jensen, Cowley, Wyo.

Application July 28, 1947, Serial No. 764,180

12 Claims. (Cl. 55—106)

This invention relates to apparatus for harvesting sugar beets and the like, plants of which the valuable portion grows in the ground and therefore must be removed from the ground at the time of harvest.

Among the objects of this invention are to provide a novel apparatus for harvesting beets and the like; to provide such apparatus which will effectively remove the beets from the ground; to provide such apparatus which will remove the beets from the ground and transfer them to a point of discharge, such as into a receptacle for the same; to provide such apparatus which will operate simultaneously on more than one row of beets; to provide such apparatus which may be mounted on a tractor or the like; to provide such apparatus which will also remove beet tops and other growth above ground which may tend to interfere with the removal of the beets; to provide such apparatus which will act positively on the beets to remove them from the ground; and to provide such apparatus which is readily controlled and is effective and efficient in operation.

Additional objects, and the novel features of this invention, will become apparent from the description which follows, taken in connection with the accompanying drawings, in which:

Fig. 1 is a longitudinal vertical section of beet harvesting apparatus constructed in accordance with this invention, mounted on a tractor and taken substantially along the line I—I of Fig. 3, looking in the direction of the arrows;

Fig. 2 is an enlarged plan view of a portion of a conveyor forming a part of the apparatus of Fig. 1;

Fig. 3 is a top plan view of the apparatus of Fig. 1, with portions of the tractor omitted for clarity of illustration;

Fig. 4 is a rear elevation of the apparatus of Fig. 1, certain parts being omitted and others being broken away;

Fig. 5 is a fragmentary top plan view of a beet removal digger, and associated parts;

Fig. 6 is a vertical section taken along line 6—6 of Fig. 5;

One form of beet harvesting apparatus, constructed in accordance with this invention, and as shown in Figs. 1 and 3, may include a pair of spaced diggers D, each rotated in the direction of the arrow of Fig. 1, for removing the beets from the ground and simultaneously from two adjacent rows; a windrower W for moving beet tops and other above-ground growth to one side; and a conveyor C onto which the removed beets are deposited and moved to a point of discharge, as to an elevated point at the side of a tractor T. Each of the foregoing parts may be mounted on the tractor T, the windrower W beneath the tractor adjacent the forward end thereof, the diggers D beneath the tractor substantially midway thereof, and the conveyor C just to the rear of the diggers D and forward of the tractor wheels 9. As will be evident, the conveyor C has a lower central section onto which the beets are thrown by the diggers D, and extends upwardly at each side, so that the removed beets may be discharged into a wagon, truck, or the like, moving along with the tractor at one side or the other, depending upon the direction of movement of the conveyor C. Or, the beets may be deposited on the ground, to be picked up later.

Figure 7:
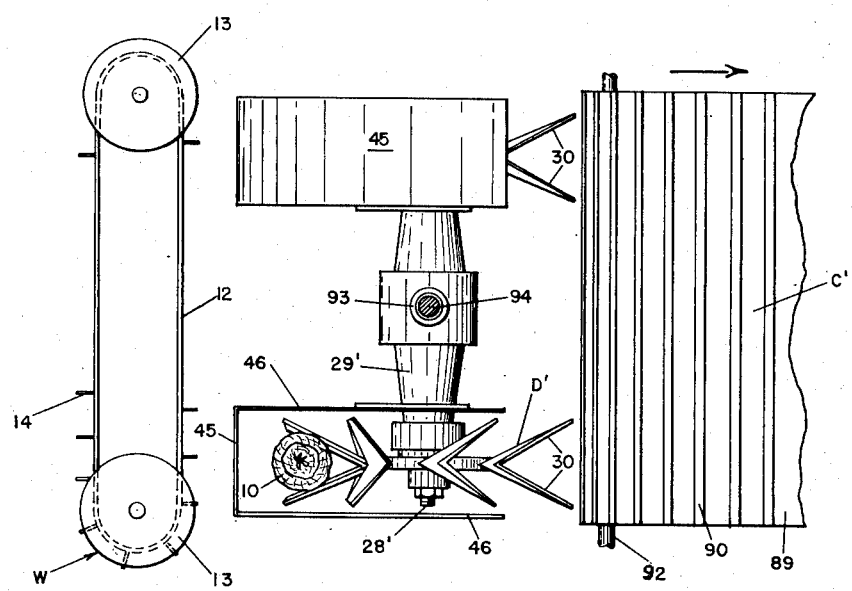
Fig. 7 is a partial top plan view of an alternative construction, certain parts being shown in section.
Figure 8:
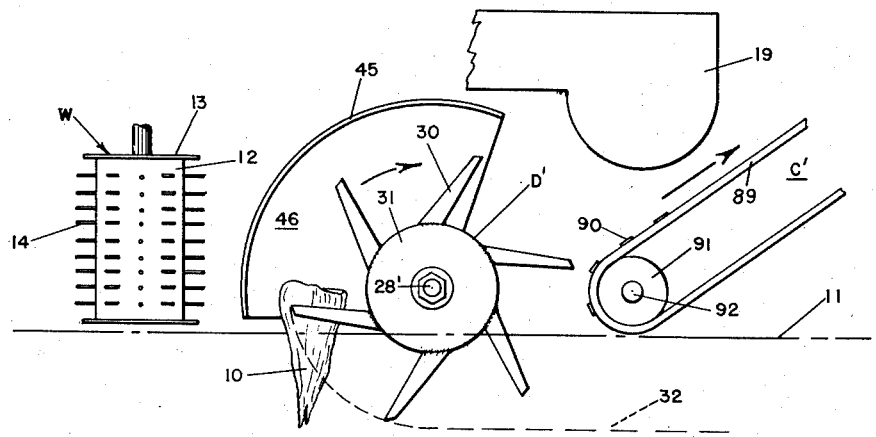
Fig. 8 is a fragmentary side elevation of the alternative construction shown in Fig. 7 and taken within one of the housings in Fig. 7.

In an alternative embodiment, shown generally in Figs. 7 and 8, the windrower W may be disposed in a more nearly vertical position, with a pair of diggers D immediately to the rear thereof and adapted to remove the beets 10 from the ground and discharge them onto a conveyor C', which extends upwardly to the rear of the tractor, on which the machine is mounted, and between the rear wheels.

In each embodiment, the windrower W comprises an endless belt 12 moving in either direction around a pair of rollers 13, and provided with a plurality of projections or spikes 14 which are adapted to engage the beet tops or other aboveground growth, to move the same to one side or the other, depending upon the direction of rotation of the rollers 13. Rollers 13 are mounted on shafts journalled in bearings 15, as in Fig. 3, and one or both of the shafts may be rotated by suitable gearing or the like, such as bevel gearing 16 of Figs. 1 and 3, driven in a manner explained later.

The windrower W may be mounted permanently on the tractor, or, as in Figs. 1 and 3, it may be mounted at the forward end of a pair of beams 17, which are pivoted at their rear ends on brackets 18, attached to the rear axle housing 19 of the tractor T. Beams 17 are adapted to be moved upwardly and downwardly, as by a power cylinder 20 pivotally attached to the upper end of a bracket 18 and adapted to push a rod 21 forwardly, as in Fig. 1. This causes an angular link 22 to pivot in a counter-clockwise direction about a fixed pin 23, mounted on tractor T. When angular link 22 pivots in this manner, the beams 17 are lifted through a link 24 pivoted at its lower end on one of the beams 17 and at its upper end to angular link 22. When the beams 17 are moved upwardly, windrower W, diggers D, and conveyor C are simultaneously moved upwardly, thereby permitting the apparatus, particularly the diggers D, to clear the ground and facilitate removal of the apparatus from one field to another or the like.

As in Figs. 1, 3, 5 and 6, each digger D may include a plurality of V-shaped forks 26 which have forward edges disposed tangentially to a central hub 27, in turn mounted on a rotating shaft 28 extending from a housing 29. Each hub 27 and the forks 26 may be formed in any suitable manner, as by two plates, each provided with a series of peripheral arms bent outwardly and disposed in opposed relation to form the forks, the fork arms being formed integrally with the hub plates. Or, as in the alternative construction of diggers D' of Figs. 7 and 8, a plurality of V-shaped forks 30 may be attached in angular relation, as by welding, to the periphery of a central hub 31. Diggers D and D' differ somewhat in constructional detail, but operate in a similar manner, such as shown in Figs. 7 and 8, the forks 30 digging a furrow 32 in the earth 11 as the apparatus moves forwardly, and each time a fork 30 engages a beet 10 the beet is impaled between the two arms of the fork and lifted out of the ground. The rotation of the diggers D and D' is preferably sufficiently fast so that the beets tend to be thrown from the diggers onto conveyors C or C'.

In the first embodiment, a housing 34 having side walls 35, as in Fig. 6, is disposed above and around each digger D, housing 34 being open at the rear and extending arcuately downwardly for a short distance at its forward end. A wheel or roller 36 is positioned just forwardly of each digger, and tends to push the beets onto the digger as the beets are removed from the ground, thus insuring that the beets will be removed effectively and deposited upon the conveyor. Each wheel or roller 36 may be mounted for rotation on a shaft or pin 37 at the front end of a double arm, arcuate bracket 38, which is pivoted at its upper end atop housing 34. Each digger housing 34 is supported from a beam 17, while shaft housing 29 is supported from the inner side walls 35, so that the diggers D will move upwardly and downwardly with beams 17, which may also be adjusted to regulate the depth of furrow made by the diggers.

The front end of each side wall 35 of a housing 34 terminates in conformity with a disc 39, there being a pair of discs ahead of each digger to slice along or into the earth 11 just enough at each side of the row to cut any tops or other trash that might pass the windrower. Each disc 39 is pivotally mounted on an arm 40 which, in turn, is adjustably mounted on a side wall 35. Thus, each arm 40 may be pivotally attached at its upper end to the side wall and provided with an adjusting bolt 41, adapted to be tightened at a desired position along a slot 42 in side wall 35, for vertical positioning of the disc 39.

In the embodiment of Figs. 7 and 8, a housing 45 extends from a point just above the earth forward of each digger D', and upwardly to a point to the rear of the center of rotation of each digger. The housing 45 may be provided with vertical side walls 46, thus enclosing the forward portion of the diggers above ground. The housing 45 insures that the beets 10 will be deposited on the conveyor C'. Housing 29' for shaft 28', on which diggers D' are mounted, is supported from the inner walls 46 of each housing 45, the housings being supported from pivotally mounted beams, as in the first embodiment. Or, if desired, shaft housing 29' may be supported from the tractor, digger housings 45 thereby being supported by shaft housing 29'.

The conveyor C of Figs. 1 and 3 may comprise a series of links, attached together at each side, as illustrated in greater detail in Fig. 2, each link comprising a rod 48 having at each side a lateral arm 49 provided with an eye 50 at the end, through which the next rod 48 extends. The spaces between the rods 48 are preferably such that the beets will not fall through, but clods of earth or the like will be permitted to fall through to the ground. The conveyor C is provided with a flat central section adjacent the ground onto which the beets are deposited by the diggers D, as will be evident from Fig. 4, and at each side an upwardly inclined section along one of which the beets are carried for deposit in a truck or the like, the side at which the beets are deposited depending upon the direction of movement of the conveyor. Each section of the conveyor C comprises upper and lower levels, and assuming the upper level to be moving in the direction of the arrows of Fig. 4, for discharge of the beets to the left side of the tractor, the upper level of the conveyor will move from the upper right downwardly beneath two sets of sprockets 51 mounted on brackets 52 depending from beams 17 and across the central section onto which the beets are deposited. The upper level of the conveyor will move the beets upwardly to the left to the point of discharge at a pair of upper sprockets 53, as in Figs. 1 and 3, around which the conveyor passes to the lower level. The lower level then moves downwardly beneath lower sprockets 54 which are also mounted on brackets 52, beneath sprockets 51. The lower level of the conveyor then passes upwardly to the right and around the right hand upper sprockets 53, from whence it again passes along the upper level downwardly to the flat central section, to receive the beets thrown thereon by the diggers D.

The upper sprockets 53 are mounted on shafts 55, journalled at the outer upper ends of angular brackets 56, which extend outwardly and upwardly from the framework 44 of tractor T to the left and right, as in Figs. 1 and 3. A pair of tie rods 57 or other stiffening members extending therebetween, as in Fig. 4, may be provided to add rigidity to brackets 56.

The conveyor C may be driven in a suitable manner, such as by chains 58 which drive upper sprockets 59, mounted on shafts 55, the chains 58, as in Figs. 3 and 4, being driven at their lower ends by sprockets 60. Sprockets 60 are mounted on a drive shaft 61 provided with one or more universal joints 62 and driven from a two-direction transmission or gear box 63, the latter of which is operated through a handle 64. The drive to gear box 63 includes a chain 65 which passes around a gear box sprocket 66 and also around a drive sprocket 67 which is mounted on an auxiliary or power take-off shaft 68, extending rearwardly from the rear axle housing 19 of the tractor T.

Chain 65 also passes around a digger drive sprocket 69 mounted on a shaft 70 and connected by a universal joint 71 with a torque tube 72, which through suitable bevel gearing or the like mounted in transverse housing 29, drives shaft 28 on the ends of which the diggers D are mounted. Torque tube 72 passes between the upper and lower levels of the center section of the conveyor C, as in Fig. 1, while universal joint 71 is preferably in alignment with the pivot points of beams 17, as evident from Figs. 1 and 3, to minimize stresses on the universal joint when the beams 17 are moved upwardly or downwardly. Also, one of the universal joints 62 in shaft 61, as in Fig. 3, is disposed as closely as possible to the plane of the pivot points for beam 17, so that stresses on these joints will be minimized.

Provision for driving windrower W from rear power take-off shaft 68 may be made, but it is preferred, as shown in Fig. 1, to drive the windrower W from a side power take-off shaft 74, normally conventional on tractors. Thus, a pulley 75 for a V-belt 76 may be mounted on shaft 74, and belt 76 also passes over a pulley 77, as in Fig. 3, for transmitting power to a two direction transmission or gear box 78, controlled by a handle 79. From transmission 78, the drive to windrower W proceeds through bevel gearing 80, a sectional slip shaft 81 provided with universal joints 82, to bevel gearing 16, as in Figs. 1 and 3. It will be understood, of course, that any other suitable manner of driving the windrower W may be utilized.

The beams 17 may be attached together to form a relatively rigid frame, as by a front plate 84 at the forward end adjacent the windrower W; intermediate plates 85 which, as in Fig. 3, connect the lower ends of brackets 52 and may be made integrally therewith; and rear plates 86, each of which also provide support for bearings 87 for shaft 61. It will be understood, of course, that the elevating conveyor C, the diggers D and associated parts, and also the windrower W, may be mounted independently on the tractor or other supporting machine.

In the embodiment of Figs. 7 and 8, the conveyor C' may comprise a link structure, such as the conveyor C of the first embodiment, or, if desired, may comprise a belt 89 provided with slats 90, the belt running around upper and lower rollers, only the lower roller 91 mounted on a shaft 92 being shown. Of course, when the conveyor C' of Figs. 7 and 8 comprises a link construction, sprockets are substituted for the rollers. The drive to windrower W, diggers D', and conveyor C' may be provided in substantially the same manner as described previously, or different drive arrangements may be utilized. For instance, when the diggers D' and housings 45 are to be supported from housing 29', such support may be through a tube 93 through which a drive shaft 94 extends. The drive shaft 94 may be disposed angularly, as in the first embodiment, or may be disposed vertically. Ordinarily, due to the rearward location of conveyor C', the windrower W and diggers D' of Figs. 7 and 8 will normally be spaced further to the rear beneath the tractor than the corresponding parts in the first embodiment, conveyor C' thereby extending from the rear underneath rear axle housing 19 of the tractor, as in Fig. 8.

From the foregoing, it will be evident that apparatus for harvesting sugar beets and the like, constructed in accordance with this invention, fulfills to a marked degree the objects and requirements hereinbefore set forth. The rela-
tively rapid rotation of the diggers D or D' insures the quick and effective impalement of the beets and the forceful deposition thereof onto the conveyor C or C'. In the first embodiment, the roller 36 tends to push the beets onto the digger D, but due to its pivotal mounting, adjusts itself to the size of a beet being removed. The housing 34 of the first embodiment, and the housing 45 of the second embodiment, insure that the beets will be deposited on the respective conveyor, and not merely thrown upwardly into the air. Thus, the housings 34 and 45 permit the beets to move outwardly along the forks 26 and 30, respectively, due to centrifugal force acting on the beets as soon as picked up by the forks, and at the same time tend to insure the deposition of the beets on the respective conveyor. If desired, stripping fingers or the like, may be provided, to insure fully removal of the beets from the diggers.

The windrower W, in removing beet tops and other growth above ground, contributes considerably to the effectiveness of the operation of the diggers, since they reduce to a minimum the tendency for the diggers or other portions of the apparatus to become clogged by an accumulation of such beet tops or growth from above ground. The windrower W may be run to either side, preferably toward that portion of the field from which the beets have already been removed. Also, the conveyor C of the first embodiment may be run in either direction, thus contributing to the versatility of the apparatus. Conveyor C' of the second embodiment, discharges the beets to the rear, which beets may be deposited upon a short-coupled wagon or other suitable trailer having a receptacle, which may be towed by the tractor or other support on which the apparatus is mounted.

Although two different embodiments of this invention have been illustrated and described, it will be understood that other embodiments of this invention may exist; and that the apparatus may be mounted on a wheeled framework provided for the purpose, to be towed by a tractor or by other motive power. It will further be understood that various additional changes may be made, all without departing from the spirit and scope of this invention.

What is claimed is:

1. Apparatus for harvesting sugar beets and the like, comprising a windrower for moving sugar beet tops and other growth above ground to one side, said windrower including an endless belt having a plurality of projections for catching beet tops and the like, said belt moving around an axis at one end of its traverse so as to throw off such beet tops and the like, said axis being disposed at an angle to the ground level; at least one digger for removing beets from the ground; and means for supporting said digger and windrower and moving the same along a row of beets or the like.

2. In apparatus for harvesting sugar beets and the like, a digger comprising a hub having a series of peripheral forks for digging a furrow along a row of beets or the like and removing successive beets from the ground; means for rotating said digger about a horizontal axis; a conveyor having a horizontal beet receiving section disposed rearwardly of said digger; and a housing disposed above said digger in spaced relation thereto, and having sides extending downwardly along each side of said digger, a roller rotatably mounted on arms which are freely pivoted on said housing, and said roller and said housing being adapted to hold beets on said forks until the beets are discharged on said conveyor.

3. In apparatus for harvesting sugar beets and the like, a forked digger rotated about a horizontal axis and constructed and arranged to dig into the ground and remove beets therefrom; a housing extending in spaced relation to said digger above the same, to permit beets to be thrown off said digger but carried around with said digger for a predetermined distance to a desired point of discharge; said housing having sides extending downwardly at each side of said digger; and a pair of discs for slicing along the ground at each side of a row of beets slightly ahead of said digger, said discs being in overlapping relation with said digger and substantially in alignment with the sides of said housing.

4. In apparatus for harvesting sugar beets and the like, a digger rotated about a horizontal axis and constructed and arranged to dig into the ground and remove beets therefrom; a housing extending in spaced relation to said digger above the same, to permit beets to be thrown off said digger but carried around with said digger for a predetermined distance to a desired point of discharge, said housing having sides extending downwardly at each side of said digger; a pair of discs for slicing along the ground at each side of a row of beets ahead of said digger, said discs being substantially in alignment with the sides of said housing; arms pivotally mounted on said sides and rotatably mounting said discs; and means for securing said arms in any one of a plurality of positions.

5. Apparatus for harvesting sugar beets and the like and adapted to be moved along one or more rows of beets by a tractor or the like, having a rear axle and rear wheels, said apparatus comprising a windrower including a pair of rollers disposed at an angle to the ground, an endless belt passing around said rollers, and spikes mounted on said belt for carrying beet tops and above ground growth to one side; a pair of housings disposed in a position corresponding to two adjacent rows of beets; a digger beneath each said housing and comprising a hub provided with peripheral forks; shaft means on the outer ends of which said diggers are mounted for rotation about a horizontal axis, said housing being disposed in spaced relation above said diggers and having sides extending downwardly to each side of said diggers; a housing for said shaft means extending to and attached to the inner sides of said digger housings; a conveyor having a lower front end disposed beneath said rear axle and between said rear wheels for receiving beets thrown thereon by said diggers, and inclined upwardly to the rear, said conveyor extending to a point of elevated discharge of said beets; drive means for said diggers extending to said digger shaft means housing; and drive means for said conveyor and said windrower.

6. In apparatus for harvesting beets and the like, a wheeled frame having a conveyor moving transversely below said frame, a rotary forked digger mounted forwardly of said conveyor on a transverse, horizontal, driven shaft, the lower extremities of said rotary forked digger moving forwardly through the ground and the upper extremities moving rearwardly toward the conveyor, a housing surrounding and spaced from said digger, arms pivotally mounted at one end on said housing and extending forwardly therefrom, a wheel rotatably mounted on the other end of said arms on a transverse horizontal axis in substantially tangential relation with said digger, a pair of discs rotatably mounted on a transverse horizontal axis located between said digger axis and said wheel axis, said discs being slightly spaced laterally and in overlapping relation with said rotary forked digger.

7. In apparatus for harvesting beets and the like, a wheeled frame having a conveyor moving transversely below said frame, a rotary forked digger mounted forwardly of said conveyor on a transverse, horizontal, driven shaft, the lower extremities of said rotary forked digger moving forwardly through the ground and the upper extremities moving rearwardly toward the conveyor, a housing surrounding and spaced from said digger, arms pivotally mounted at one end on said housing and extending forwardly therefrom, a wheel rotatably mounted on the other end of said arms on a transverse horizontal axis in substantially tangential relation with said digger, a windrower for removing the beet tops adapted to be mounted forwardly of the digger comprising a pair of shafts extending downwardly toward the ground, a pair of spools mounted respectively on said shafts, an endless belt operatively mounted on said spools, a plurality of projections on the outer surface of said belt adapted to engage said beet tops and remove them to one side of the apparatus, and means for rotating one of said shafts.

8. In beet harvesting apparatus of the class described adapted to be mounted on a power driven tractor, a frame work pivotally mounted on the rearward portion of said tractor, a conveyor mounted on said framework adapted to convey beets to an elevated point of discharge, a horizontal, transverse, driven shaft mounted on said framework forwardly of said conveyor, a pair of rotary, forked diggers mounted respectively at opposite ends of said shaft, said diggers being spaced laterally to operate on adjacent rows of beets and rotating in a direction to move forwardly through the ground uprooting said beets and to carry said beets upwardly and rearwardly onto said conveyor, a pair of shafts extending downwardly from said framework forwardly and outwardly of said diggers, a pair of spools mounted respectively on said shafts, an endless belt having a plurality of outwardly extending projections thereon operatively mounted on said spools for moving the beet tops to one side or the other in advance of said diggers, and means driving one of said pair of shafts.

9. A beet harvesting apparatus as set out in claim 8 wherein said conveyor has a transverse, horizontal run and upwardly and outwardly extending runs at opposite ends of said transverse runs to a common elevated point of discharge for the beets deposited thereon by both of said diggers.

10. A beet harvesting apparatus as set out in claim 8 wherein said conveyor has a transverse, horizontal run and upwardly and outwardly extending runs at opposite ends of said transverse runs to a common elevated point of discharge for the beets deposited thereon by both of said diggers, means for selectively operating said conveyor in either direction so as to discharge the beets at an elevated point on either side, and means for selectively operating said driving means in either direction for depositing said beet tops on either side.

11. A beet harvesting apparatus as set out in claim 8 wherein each of said diggers has a housing substantially surrounding the upper portion, a wheel rotatably mounted on arms extending forwardly and pivotally mounted on said housing, said wheel rolling on the ground in advance of said digger and in substantially tangential relation to said digger, a pair of discs mounted forwardly and outwardly of each of said diggers in overlapping relation thereto, said discs being aligned and in adjacent relation with the sides of said housing.

12. A beet harvesting apparatus as set out in claim 8 wherein said conveyor extends upwardly and rearwardly from said diggers to a common elevated point of discharge for the beets deposited thereon by both of said diggers.

THERON H. JENSEN.

REFERENCES CITED

The following references are of record in the file of this patent:

UNITED STATES PATENTS

| Number | Name | Date |
| --- | --- | --- |
| 132,210 | Hutchinson et al. | Oct. 15, 1872 |
| 391,059 | McLaren | Oct. 16, 1888 |
| 395,132 | Graham | Dec. 25, 1888 |
| 627,520 | Packham | June 27, 1899 |
| 773,279 | Dewey | Oct. 25, 1904 |
| 856,817 | Smith | June 11, 1907 |
| 1,002,895 | Briggs | Sept. 12, 1911 |
| 1,246,811 | Finkbeiner | Nov. 13, 1917 |
| 1,303,857 | Crume | May 20, 1919 |
| 1,723,608 | Dott et al. | Aug. 6, 1929 |
| 2,601,395 | Daniels et al. | Nov. 17, 1936 |

FOREIGN PATENTS

| Number | Country | Date |
| --- | --- | --- |
| 396,454 | France | Apr. 13, 1909 |